(12) United States Patent  
Atef et al.

(10) Patent No.: US 9,246,851 B2  
(45) Date of Patent: Jan. 26, 2016

(54) WIRELESS MEMORY MANAGEMENT

(71) Applicant: Atmel Corporation, San Jose, CA (US)

(72) Inventors: Michael Atef, Cairo (EG); Nabil Yousef Wasily, Foothill Ranch, CA (US)

(73) Assignee: Atmel Corporation, San Jose, CA (US)

( * ) Notice: Subject to any disclaimer, the term of this patent is extended or adjusted under 35 U.S.C. 154(b) by 82 days.

(21) Appl. No.: 13/904,014

(22) Filed: May 28, 2013

(65) Prior Publication Data

US 2013/0322467 A1 Dec. 5, 2013

Related U.S. Application Data

(60) Provisional application No. 61/652,642, filed on May 29, 2012.

(51) Int. Cl.  
*H04L 12/861* (2013.01)

(52) U.S. Cl.  
CPC .................................. *H04L 49/9057* (2013.01)

(58) Field of Classification Search  
CPC .................................................. H04L 49/9057  
USPC ........................................................ 370/474  
See application file for complete search history.

(56) References Cited

U.S. PATENT DOCUMENTS

2008/0170533 A1* 7/2008 Cyzs et al. ..................... 370/315  
2009/0216988 A1* 8/2009 Palladino ....................... 711/171  
2010/0070695 A1* 3/2010 Baek et al. ..................... 711/104

* cited by examiner

*Primary Examiner* — Charles C Jiang  
*Assistant Examiner* — Thad Defauw  
(74) *Attorney, Agent, or Firm* — Fish & Richardson P.C.

(57) ABSTRACT

Memory management for WiFi Media Access Control (MAC) frames includes dividing a memory into equally-sized smaller chunks; writing a MAC frame that is larger in size than one-chunk size into several chunks; appending special information to each chunk to specify whether the chunk is a starting chunk or an intermediate chunk of the MAC frame or whether the chuck is currently unoccupied at all; linking the chunks carrying the MAC frame; and specifying a task waiting to be performed for the MAC frame. The several chunks may be noncontiguous or contiguous. The memory management technique may further comprise searching the memory for chunks comprising frames waiting for a certain task. The memory management technique may further comprise marking the chunks as empty after the certain task is completed.

20 Claims, 11 Drawing Sheets

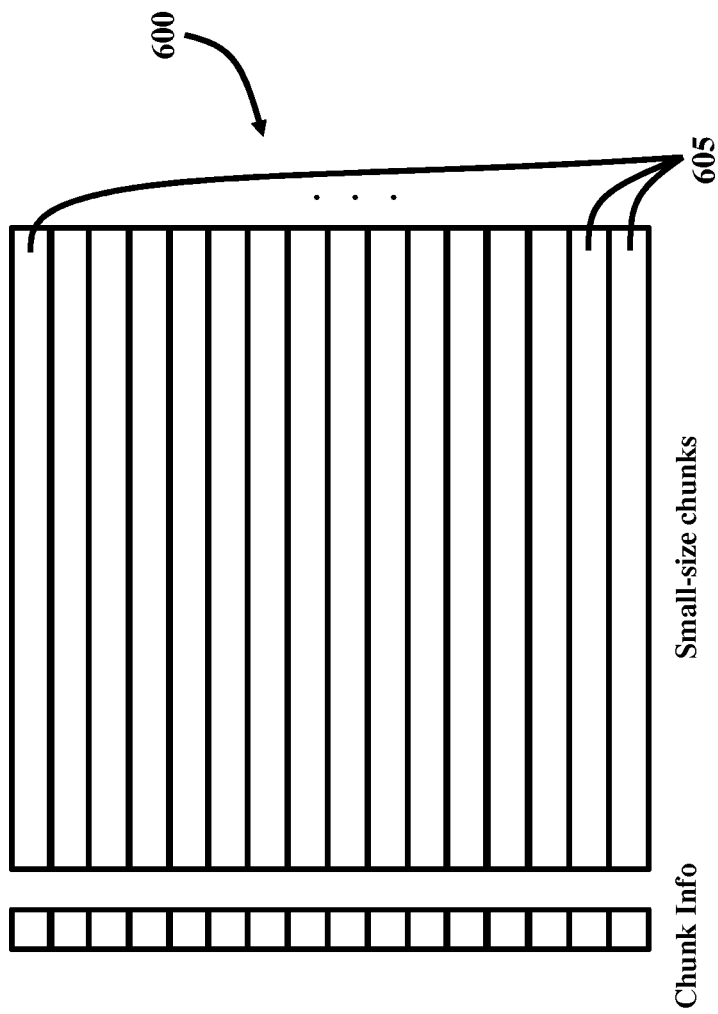

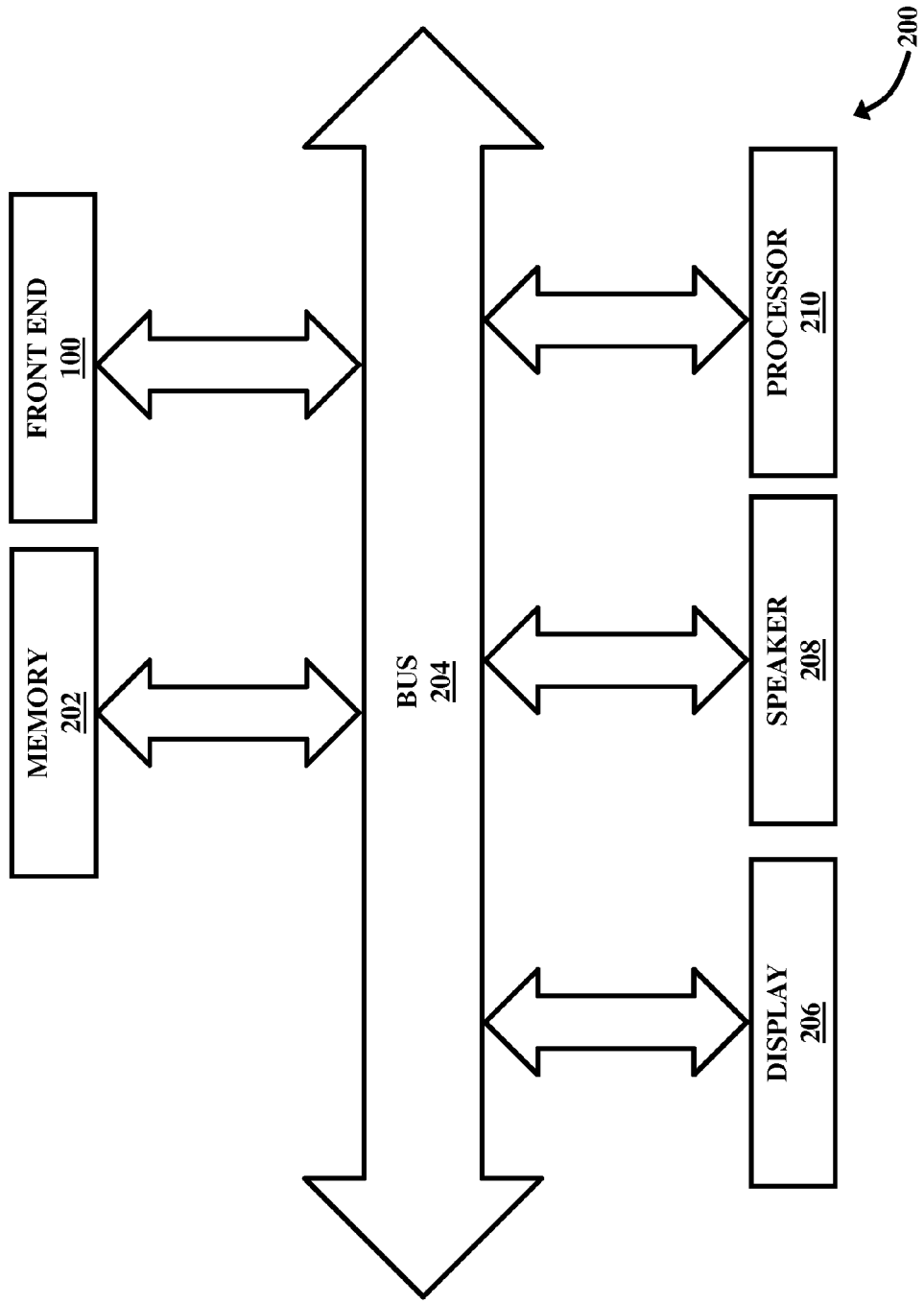

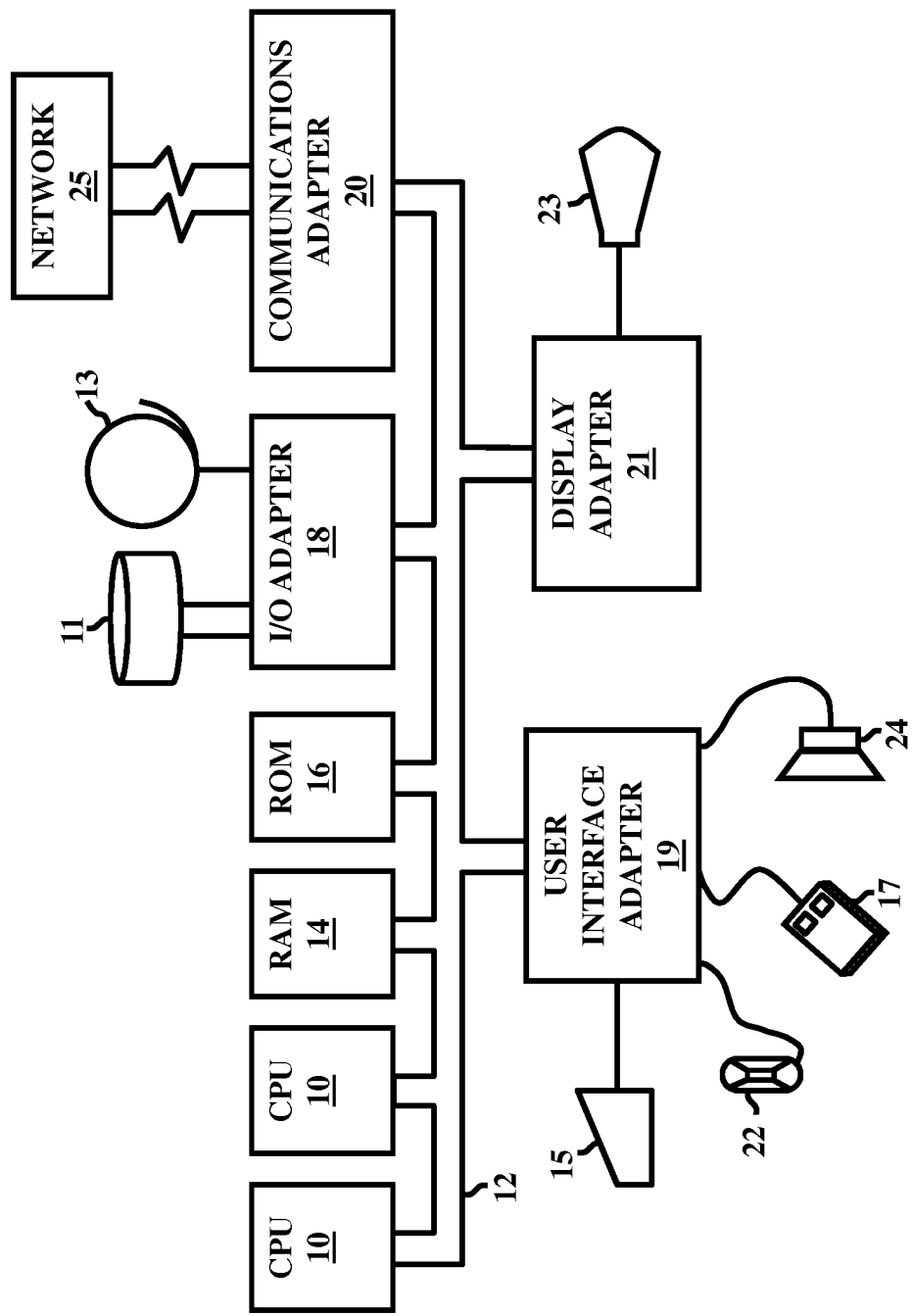

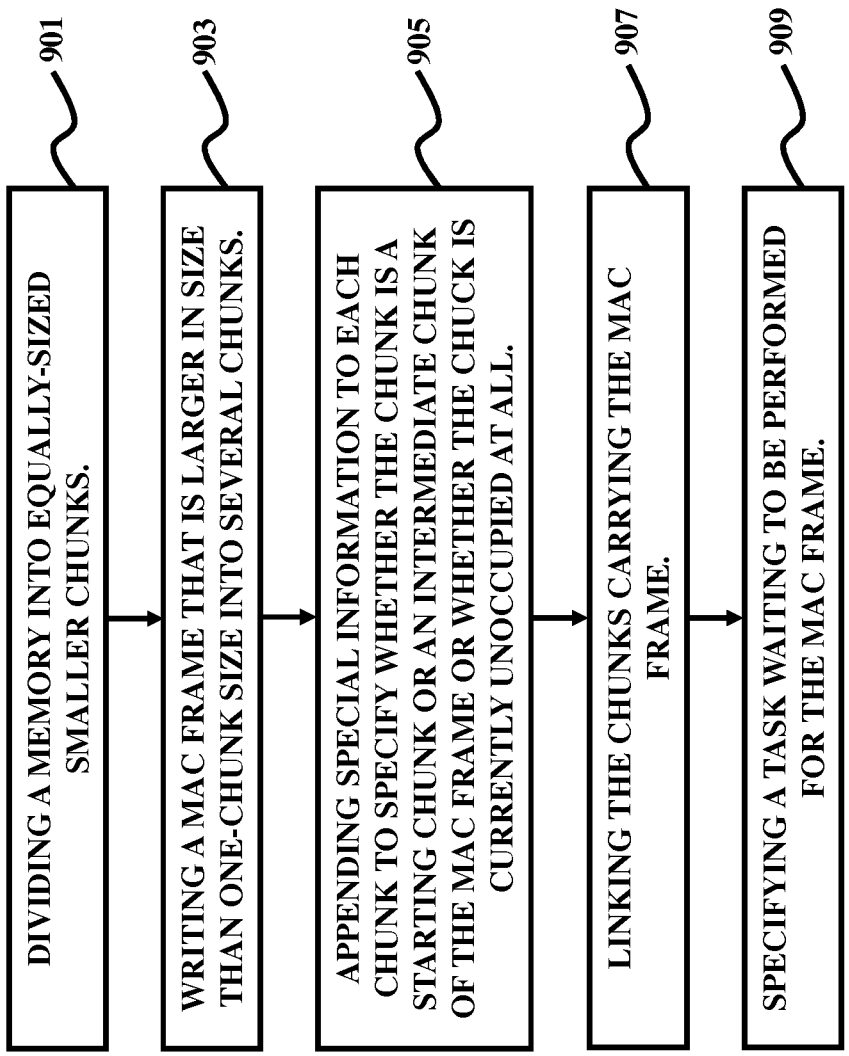

WIRELESS MEMORY MANAGEMENT

CROSS-REFERENCE TO RELATED APPLICATIONS

This application claims priority to U.S. Provisional Application Ser. No. 61/652,642 filed on May 29, 2012, the complete disclosure of which, in its entirety, is herein incorporated by reference.

BACKGROUND

1. Technical Field

The embodiments herein generally relate to wireless technologies, and more particularly to WiFi technologies.

2. Description of the Related Art

In IEEE standards 802.11a/b/g/n, more commonly known as WiFi, packets containing data, information, or connection requirements are transmitted and received by an access point (AP) and a station. The physical (PHY) layer 46 is responsible for demodulating signals received over the air before passing data bits on to the Media Access Control (MAC) layer 48 and for modulating data bits from the MAC layer 48 to be transmitted over the air. FIG. 1A depicts an overall WiFi PHY/MAC architecture 40 of a WiFi application specific integrated circuit (ASIC). Data and management packets are transferred through the interface between MAC layer 48 and PHY layer 46 as MAC frames 50 (shown in FIG. 1B). MAC frames 50 (as shown in FIG. 1B) have variable size according to their data or management payload.

The WiFi-MAC frame formats: As indicated in FIG. 1B, a MAC frame 50 contains the MAC header 52, frame body 54, and frame check sequence (FCS) 56; so the MAC frame 50 is the error-detection and retransmission unit. The MAC frame 50 can be either a control frame, a management frame (MMPDU), or a data frame (MPDU). Control frames are processed on the fly and not stored in the shared memory. Control frames do not have a frame body. Examples are RTS, CTS, ACK, and blockACK. Management frames (MMPDU) are stored in the shared memory and processed by the MLME (MAC layer management entity). MMPDUs are very important and should have higher priority than normal data frames, so a small buffer control is suggested to ensure that there is some space in the memory for expected management frames. Examples are beacons and association exchange frames. Data frames (MPDU) are passed to or from the host and stored in the shared memory. The constituting block is the MSDU. A data frame (MPDU) can carry a fragment of the MSDU, a complete MSDU, or an aggregated MSDU (AMSDU, this is more than one MSDU separated by short headers).

Furthermore, with respect to aggregation, the physical layer (PHY) payload (called PSDU) can be a control frame, a MMPDU, a MPDU, or an aggregated MPDU (A-MPDU, this is more than one MPDU separated by short headers). One or more MPDUs and/or A-MPDUs can be acknowledged with on eframe called a block-ACK. However, inside the block-ACK each MPDU is acknowledged (and thus can be retransmitted) separately. A MPDU in an A-MPDU and can carry a single MSDU or A-MSDU. The latter case forms the two-level aggregation. FIG. 2A illustrates a one-level frame aggregation for A-MSDU. FIG. 2B illustrates a one-level frame aggregation for A-MPDU. FIG. 3 illustrates a two-level frame aggregation.

There are further rules and limits: With respect to fragmentation (as shown in FIG. 4), all maximum of 16 fragments should be supported. With respect to A-MSDU, the maximum number of aggregated MSDUs has no limit. The maximum length: either 3839 or 7395 bytes. One permanent value is supported by the STA upon association with an AP. The A-MSDU cannot be fragmented. With respect to A-MPDU, the maximum number of aggregated MPDUs: min(64, window size). The maximum length=either 8, 16, 32, or 64 kB. One permanent value is supported by the STA upon association with an AP. The window size mentioned above can be controlled and negotiated every data transfer operation. The whole window size is expected to be supported by the peer memory. MPDUs within the window size may not be sent in order. A constituting MPDU can carry one MSDU or one AMSDU as far as the MPDU length does not exceed 4 kB. Two-level aggregation is optional and can be controlled and negotiated every data transfer operation. The A-MPDU cannot be fragmented. With respect to the PSDU, the maximum time of min(the available channel opportunity, 10 ms).

Next, with respect to UP, TID, and AC: There are 8 user priorities (UPs) that are available according to the data content. Along with 8 other reserved values for contention-free channels, these 16 values form the TID value. Each 2 relevant UPs are mapped to one of four Access Category (AC), namely: Voice, Video, Best effort and background data. Channel access rules vary according to ACs. Management frames shall be sent using the voice (highest-priority) AC. FIG. 5 illustrates the mapping of UPs to ACs.

The conventional architecture uses a shared memory architecture with a shared descriptor memory and the shared packet memory. A special memory is dedicated for temporary storage of MAC frames in the following cases: Frames waiting to be transmitted on the air; Frames waiting to be acknowledged by the addressed WiFi station; Frames waiting to be reordered after reception from the air; and Frames waiting to be passed to upper protocol layers. Due to the different cases above, a MAC frame should be written, accessed and deleted from this memory independent of other MAC frames. The memory can be logically divided into equally-sized chunks, so that each chunk can carry the maximum-length MAC frame, but this results in memory dissipation since MAC frames can have smaller lengths than the maximum length. Therefore, it would be desirable to find a way to support fast access to any variable-sized MAC frame in the memory while reducing the memory overhead.

SUMMARY

In view of the foregoing, an embodiment herein provides a method of performing memory management for MAC frames, the method comprising dividing a memory into equally-sized smaller chunks; writing a MAC frame that is larger in size than one-chunk size into several chunks; appending special information to each chunk to specify whether the chunk is a starting chunk or an intermediate chunk of the MAC frame or whether the chuck is currently unoccupied at all; linking the chunks carrying the MAC frame; and specifying a task waiting to be performed for the MAC frame. The several chunks may be noncontiguous or contiguous. The method may further comprise searching the memory for chunks comprising frames waiting for a certain task. The method may further comprise marking the chunks as empty after the certain task is completed. The MAC frame is assigned chunks by determining whether a sufficient number of chunks are available for use in a sequence of chunks; reserving a required number of chucks for the MAC frame by decreasing a number of available chunks by the required number of chunks; setting an occupied bit of a first address in a mini-chunk-pool; searching for a next empty chunk in the sequence of chunks; and placing an address of the next empty chunk in the mini-chunk-pool. The method may further comprise creating a logical gate for the memory. The method may further comprise closing the logical gate for both transmission and reception data directions. Alternatively, the method may further comprise closing the logical gate for either a transmission data direction or a reception data direction. The MAC frame comprises a WiFi MAC frame.

Another embodiment provides a memory management system for MAC frames, the system comprising a memory component that is divided into equally-sized smaller chunks; a MAC frame that is larger in size than one-chunk size, wherein the MAC frame is written into several chunks, wherein each chunk comprises special information that specifies whether the chunk is a starting chunk or an intermediate chunk of the MAC frame or whether the chuck is currently unoccupied at all; means for linking the chunks carrying the MAC frame; and means for specifying a task waiting to be performed for the MAC frame. The several chunks are non-contiguous or contiguous. A memory manager searches the memory for chunks comprising frames waiting for a certain task. The memory manager marks the chunks as empty after the certain task is completed. The MAC frame is assigned chunks by determining whether a sufficient number of chunks are available for use in a sequence of chunks; reserving a required number of chucks for the MAC frame by decreasing a number of available chunks by the required number of chunks; setting an occupied bit of a first address in a mini-chunk-pool; searching for a next empty chunk in the sequence of chunks; and placing an address of the next empty chunk in the mini-chunk-pool. The system may further comprise a logical gate for the memory, wherein the logical gate may be closed for both transmission and reception data directions. Alternatively, the logical gate is closed for either a transmission data direction or a reception data direction. The MAC frame comprises a WiFi MAC frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 6A and 6B illustrate a memory architecture according to an embodiment herein;

FIG. 7 illustrates a block diagram of a receiver according to an embodiment herein;

FIG. 8 illustrates a block diagram of a computer system according to an embodiment herein; and FIG. 9 is a flow diagram illustrating a method according to an embodiment herein.

DETAILED DESCRIPTION OF PREFERRED EMBODIMENTS

Figure 1A:
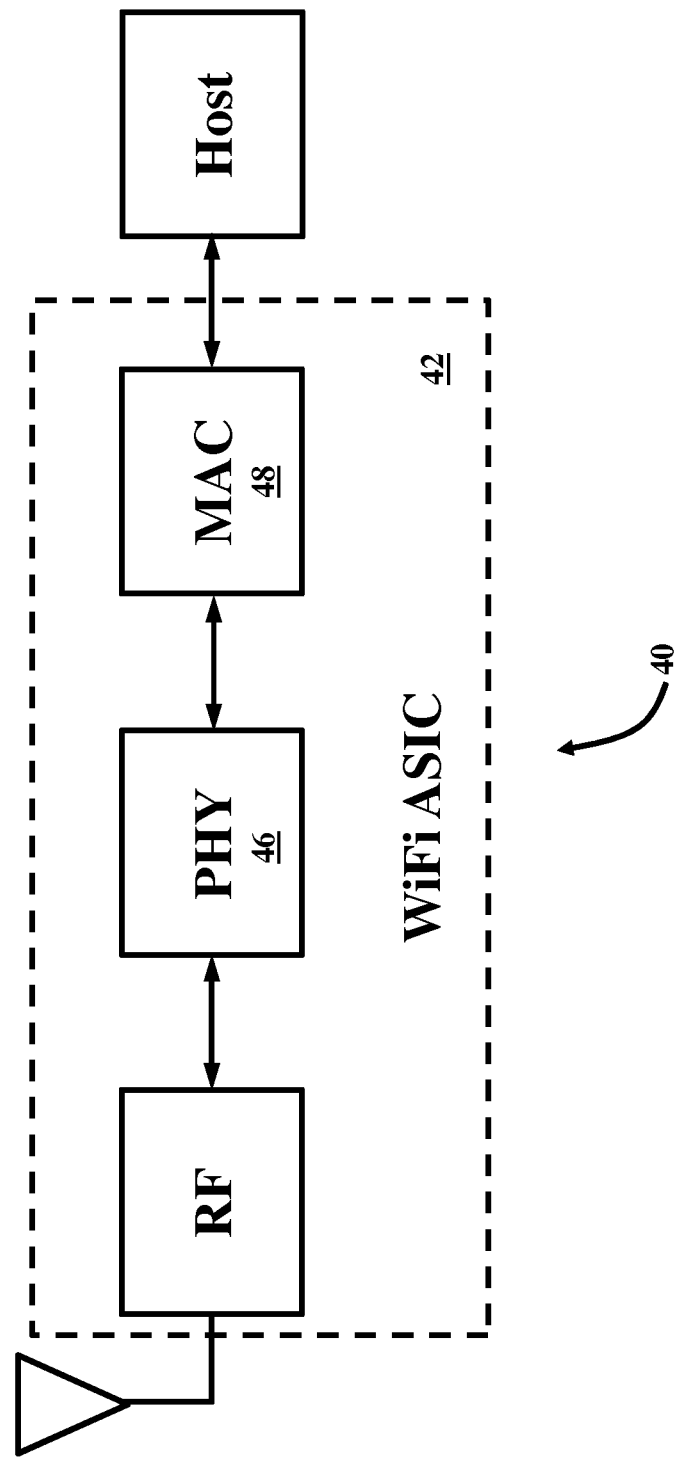
FIG. 1A illustrates a block diagram of a WiFi PHY/MAC architecture of a WiFi ASIC.
Figure 1B:
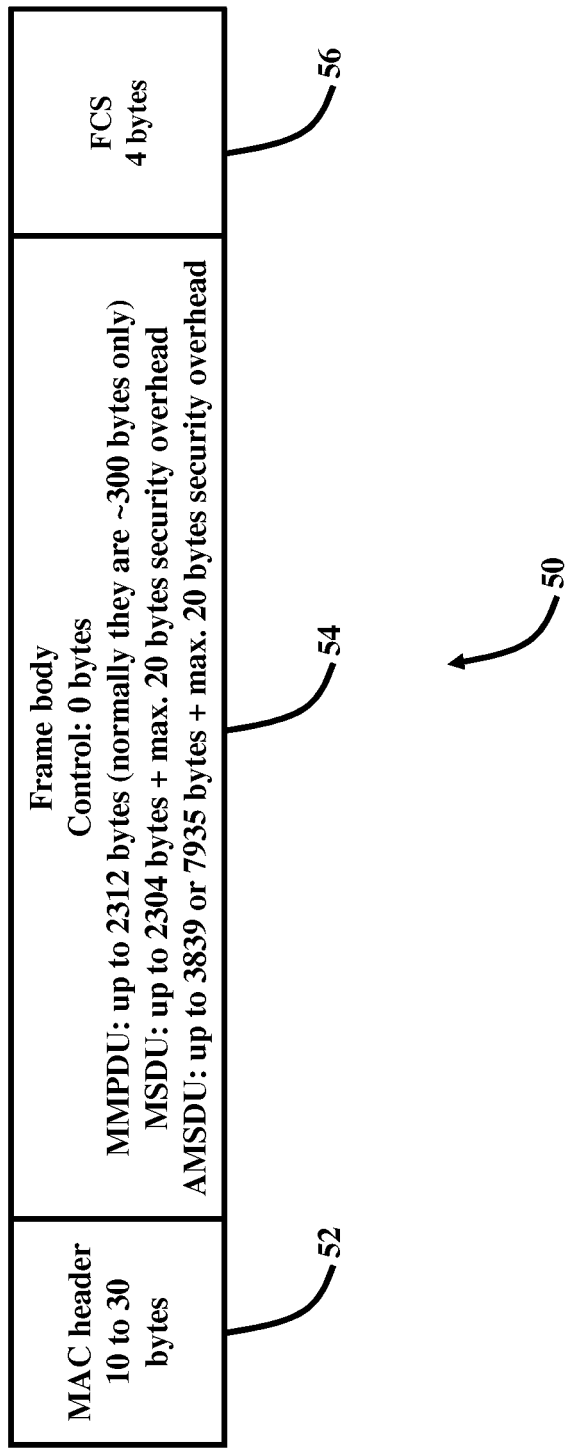
FIG. 1B illustrates a representation of a MAC frame.
Figure 2A:
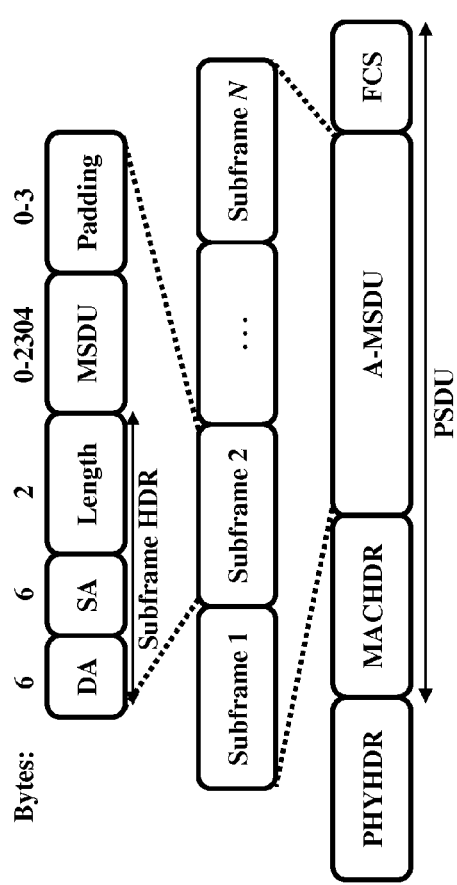
FIG. 2A illustrates a one-level frame aggregation for A-MSDU.
Figure 2B:
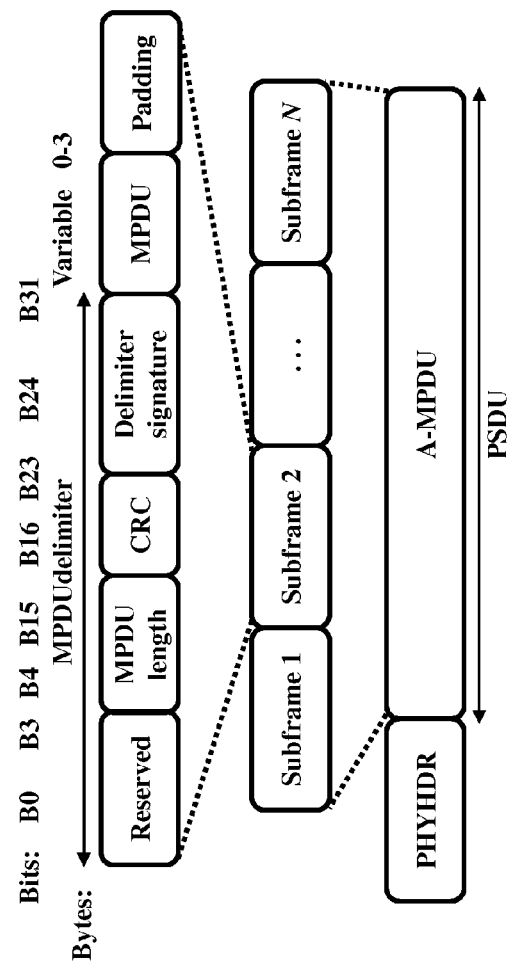
FIG. 2B illustrates a one-level frame aggregation for A-MPDU.
Figure 3:
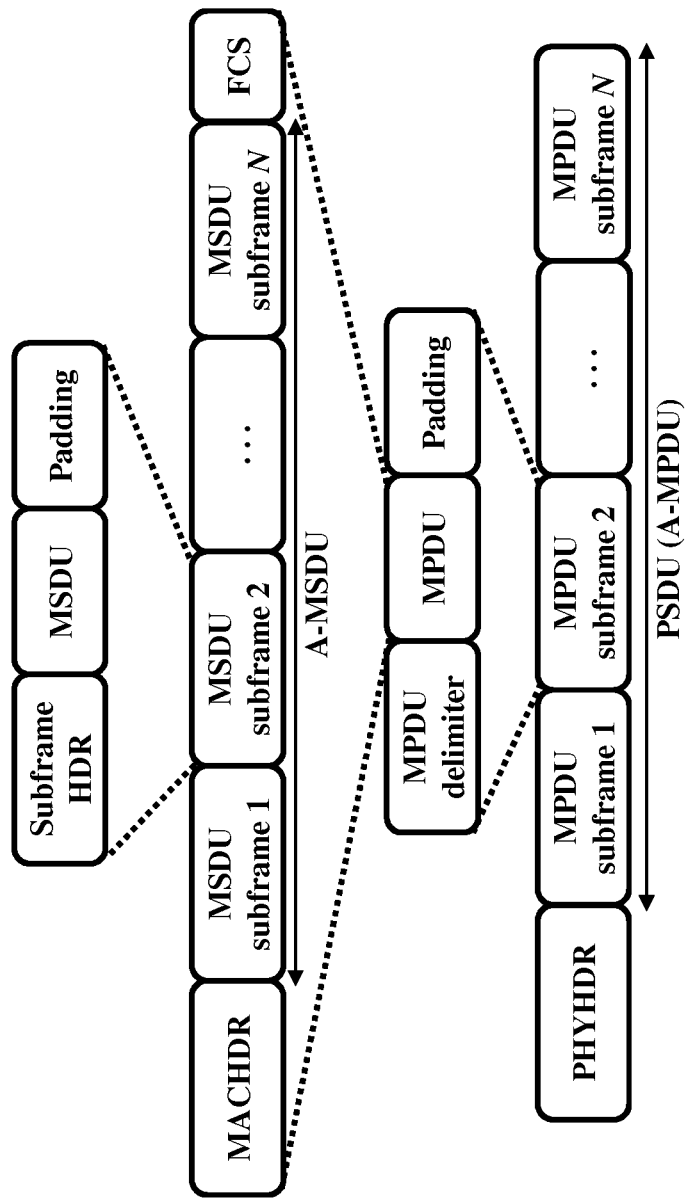
FIG. 3 illustrates a two-level frame aggregation technique.
Figure 4:
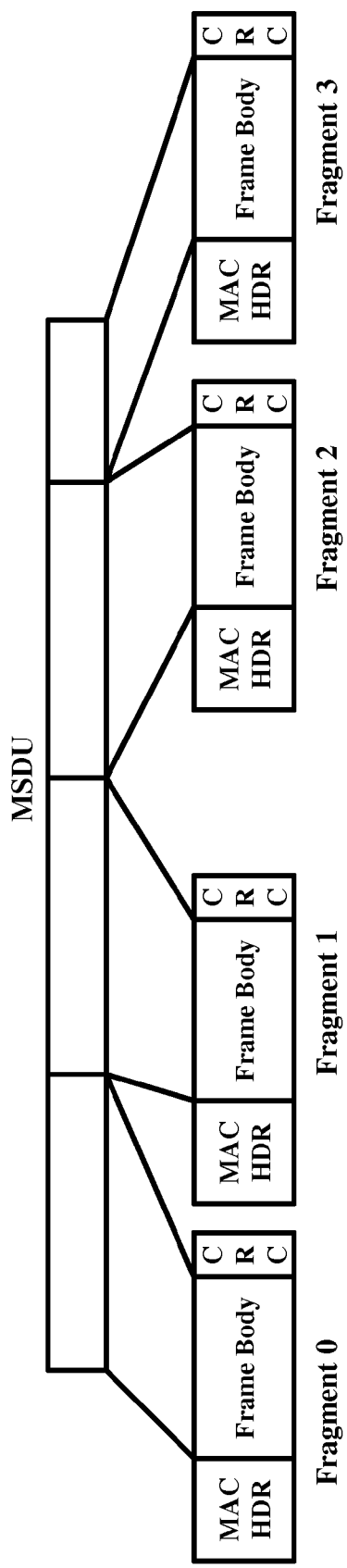
FIG. 4 illustrates a fragmentation example.
Figure 5:
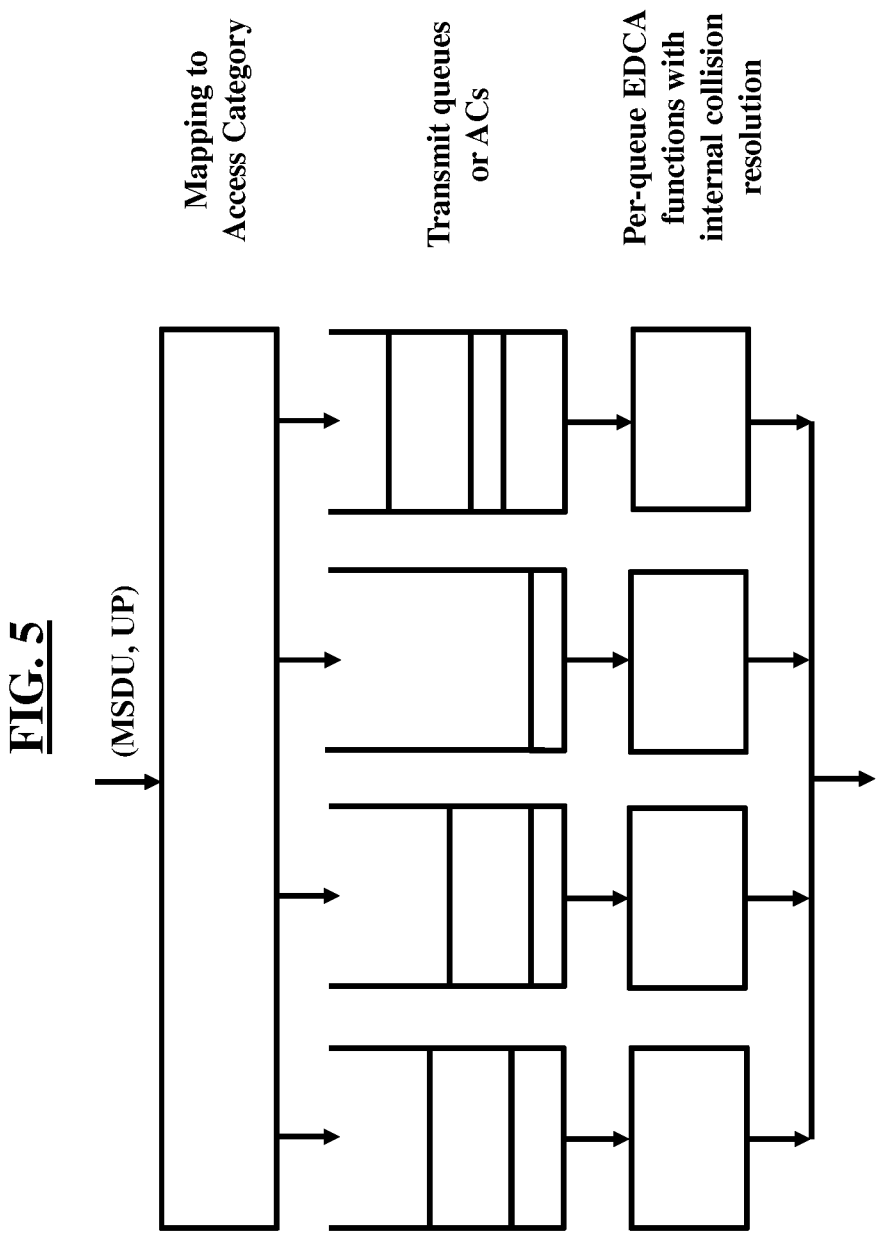
FIG. 5 illustrates the mapping of UPs to ACs.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a WiFi memory management technique that supports fast access to any variable-sized MAC frame in the memory while reducing the memory overhead. Referring now to the drawings, where similar reference characters denote corresponding features consistently throughout the figures, there are shown preferred embodiments.

The memory 600 can be divided into equally-sized smaller chunks 605, as shown in FIG. 6A, with reference to FIG. 1A through 5. MAC frames (e.g., MAC frame 50 of FIG. 1B) that are larger in size than one-chunk size span several chunks that do not need to be contiguous. Special information is appended to each chunk to specify if the chunk is the starting or intermediate chunk of a MAC frame or currently unoccupied at all, link the chunks carrying a MAC frame and specify the task waiting to be done for this frame. This process may be implemented using any appropriate hardware including digital signal processors, buffers, arithmetic units, data memories, controllers, or a combination of these, for example, among other components or in combination with software.

Figure 6B:
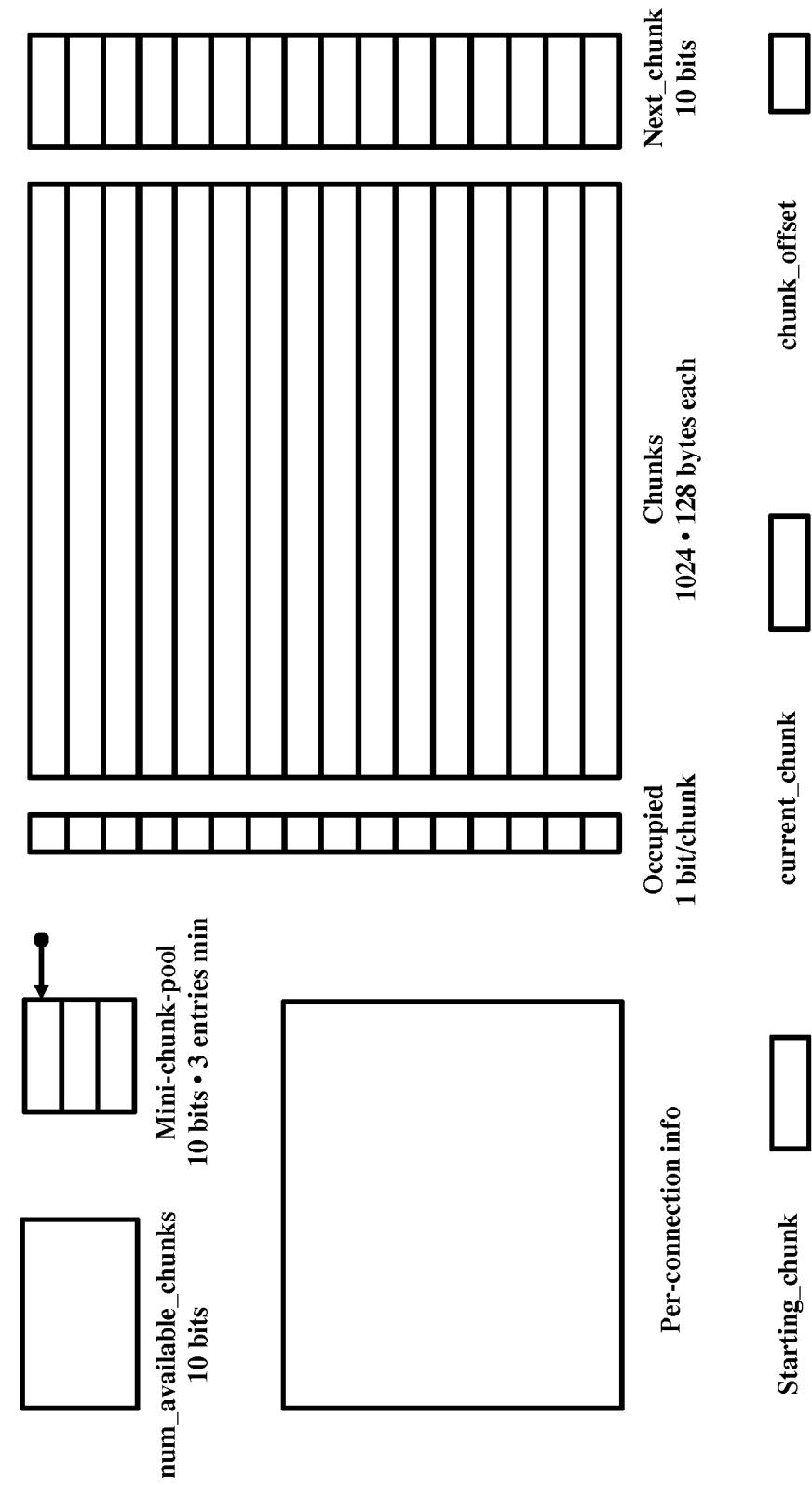

A memory manger is implemented. This memory manager writes new MAC frames into empty chunks, searches within the memory 600 for chunks with frames waiting for a certain task, and marks such chunks as empty after the task is completed. FIG. 6B further illustrates the memory architecture 600 according to the embodiments herein. The embodiments herein assign chunks in the following manner: (1) To assign a number of chunks, determine from num_available_chunks if enough chunks are available. (2) Reserve the required number of chunks by decreasing num_available_chunks by that required number. (3) Set the 'occupied' bit of the first address in the mini-chunk-pool. (4) Search for the next empty chunk and place its address in the mini-chunk-pool. Here, to function correctly, the single-chunk writing time should not exceed the max. search time, which is 1023 clk cycles (if the chunks are searched sequentially, each in a clk cycle). Otherwise, one can increase the mini-pool-chunk size or increase the search speed.

In order to release the chunks, (1) reset the full_flag's. (2) The next_chunk entries become meaningless. (3) Update num_available_chunks, adding the number of released chunks. Next, Writing/Reading a packet involves (1) using the packet's length, the number of chunks needed for a packet can be computed. (2) Assign and start writing in the chunks. Whenever a new chunk is needed, link it to the current chunk through the latter's next_chunk entry. (3) A packet starts with the header, including the packet's length. (4) To read the packet, you only need the first chunk address, read the packet's length in the header and jump through the next_chunk entries.

The memory management for Rx operations occurs according to the following: (1) Only frames with correct Rx, zero protocol version and matching RA are written in the memory. (2) Since the host is responsible for the re-ordering operation, MSDUs are appended to each other within a chunk for all TIDs, as they will be sent to the host and released as one bunch. (3) Defragmentation is performed in separate chunks then the chunks are linked to the tail of the queue if defragmention succeeds, or deleted from the memory if it fails. (4) Packets starting from starting_chunk till current_chunk, and linked in-between by the next_chunk entries are mapped to the host. (5) Due to defragmentation operations, some intermediate chunks may not be completely full. If one cannot find the header immediately after the end of the previous packet in an intermediate chunk, just proceed to the next chunk. (6) After delivering the data packets to the host, release the chunks, and reset starting_chunk, current_chunk and chunk_offset.

With respect to memory fullness control, the goal is to ensure that there are always enough memory space for management Tx/Rx frames. Another goal is to ensure fair throughput and frame-dropping rate at both traffic directions (Tx/Rx) when the memory is nearly full. This problem may occur if the host speed is too high or too low compared to the WLAN speed. In order to solve this, the embodiments herein provide a logical gate for the memory. The gate being open (closed) does not mean that the memory has (has not) enough space for writing the packet. One may close the gate for both Tx and Rx data directions (to increase management buffers) or for only one direction (to decrease the frame-dropping rate in the other direction).

The design parameters are as follows:
1. Mgmt_reserve: minimum no. of buffers to be always available for management frames.
2. Tx_drop_weight: to provide the desired throughput ratio across both traffic directions.
3. Rx_drop_weight: to provide the desired throughput ratio across both traffic directions.
4. Hysteresis: defines when to favor a traffic direction.
5. Step: defines how much to favor a traffic direction.
6. Time to update The variables are as follows:
1. Tx_drop_rate: how many dropped host packets in some time
2. Rx_drop_rate: how many dropped Rx packets in some time
3. Rx_reserve: minimum no. of buffers to be always available for Rx if +ve or Tx if −ve
4. Total_free_buffers: Current Physically-unused buffers The procedure for every packet (pseudo-code) is as follows:

```
If mgmt rx or tx
    success = 1; % gate is always open for management frames
    If success
        success = Write_packet_in_memory;
        If success == 0
            % we need more reserved management memory,
increase it manually
    Elseif data tx
        success = required buffers < Total_free_buffers −
Mgmt_reserve − max(Rx_reserve , 0);
        If success
            success = Write_packet_in_memory;
            If success == 0      % gate closed or non-enough
```

```
physically-empty packets
            Tx_drop_rate = Tx_drop_rate + Tx_drop_weight;
    Elseif data rx
        success = required buffers < Total_free_buffers −
Mgmt_reserve + min(Rx_reserve , 0);
        If success
            success = Write_packet_in_memory;
            If success == 0      % gate closed or non-enough
physically-empty packets
            Rx_drop_rate = Rx_drop_rate + Rx_drop_weight;
```

The update Rx reserve (pseudo-code) is as follows:

```
If abs(Tx_drop_rate − Rx_drop_rate) < hysteresis
    % do nothing
Elseif Rx_drop_rate > Tx_drop_rate
    Rx_reserve = Rx_reserve + step;
Else
    Rx_reserve = Rx_reserve − step;
% reset
Tx_drop_rate = 0;
Rx_drop_rate = 0;
```

FIG. 7 illustrates an exploded view of a receiver 200 having a memory 202 comprising a computer set of instructions. The receiver 200 further includes a bus 204, a display 206, a speaker 208, and a processor 210 capable of processing a set of instructions to perform any one or more of the methodologies herein, according to an embodiment herein. The processor 210 may also enable analog content to be consumed in the form of output via one or more displays 206 or audio for output via speaker and/or earphones 208. The processor 210 may also carry out the methods described herein and in accordance with the embodiments herein. The content may also be stored in the memory 202 for future processing or consumption. A user of the receiver 200 may view this stored information on display 206. When the content is selected, the processor 210 may pass information. The content may be passed among functions within the receiver 200 using bus 204. The receiver 200 may be operatively connected to a front end 100 for communication within a wireless communication network 25 (of FIG. 8).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 9, with reference to FIGS. 1A through 8, is a flow diagram illustrating a method of performing memory management for MAC frames 50, the method comprising dividing (901) a memory 600 into equally-sized smaller chunks; writing (903) a MAC frame that is larger in size than one-chunk size into several chunks 605; appending (905) special information to each chunk 605 to specify whether the chunk 605 is a starting chunk or an intermediate chunk of the MAC frame 50 or whether the chuck 605 is currently unoccupied at all; linking (907) the chunks carrying the MAC frame 50; and specifying (909) a task waiting to be performed for the MAC frame 50. The several chunks 605 may be noncontiguous or contiguous. The method may further comprise searching the memory 600 for chunks 605 comprising frames 50 waiting for a certain task. The method may further comprise marking the chunks 605 as empty after the certain task is completed. The MAC frame 50 is assigned chunks 605 by determining whether a sufficient number of chunks are available for use in a sequence of chunks; reserving a required number of chucks for the MAC frame 50 by decreasing a number of available chunks by the required number of chunks; setting an occupied bit of a first address in a mini-chunk-pool; searching for a next empty chunk in the sequence of chunks; and placing an address of the next empty chunk in the mini-chunk-pool. The method may further comprise creating a logical gate (not shown) for the memory 600. The method may further comprise closing the logical gate for both transmission and reception data directions. Alternatively, the method may further comprise closing the logical gate for either a transmission data direction or a reception data direction. The MAC frame 50 comprises a WiFi MAC frame.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing memory management for Media Access Control (MAC) frames, said method comprising:

dividing a memory into equally-sized chunks;
determining whether a sufficient number of the chunks are available to store a MAC frame;
reserving a required number of chunks for the MAC frame by decreasing a number of available chunks by the required number of chunks;
searching for a first empty chunk;
storing a first address of the first empty chunk in a mini-chunk pool;
setting a first occupied bit of the first address;
searching for a second empty chunk;

writing a first portion of the MAC frame into the first empty chunk while searching for the second empty chunk;

placing a second address of the second empty chunk in the mini-chunk pool;

writing a second portion of the MAC frame into the second empty chunk; and linking the first and second chunks carrying the MAC frame.

2. The method of claim 1, wherein the first and second empty chunks are noncontiguous in the memory.

3. The method of claim 1, wherein the first and second empty chunks are contiguous in the memory.

4. The method of claim 1, further comprising searching the memory for occupied chunks comprising frames waiting for a task.

5. The method of claim 4, further comprising marking the occupied chunks as empty after the task is completed.

6. The method of claim 1, further comprising creating a logical gate for the memory.

7. The method of claim 6, further comprising closing the logical gate for both transmission and reception data directions.

8. The method of claim 6, further comprising closing the logical gate for either a transmission data direction or a reception data direction.

9. The method of claim 1, wherein the MAC frame comprises a WiFi MAC frame.

10. The method of claim 1, wherein a writing time for writing the first portion into the first empty chunk is no more than a search time for searching the second empty chunk.

11. A memory management system for Media Access Control (MAC) frames, the system comprising:

memory;

one or more processors coupled to the memory and configured for:

dividing the memory into equally-sized chunks;

determining whether a sufficient number of the chunks are available to store a MAC frame;

reserving a required number of chunks for the MAC frame by decreasing a number of available chunks by the required number of chunks;

searching for a first empty chunk;

storing a first address of the first empty chunk in a mini-chunk pool;

setting a first occupied bit of the first address;

searching for a second empty chunk;

writing a first portion of the MAC frame into the first empty chunk while searching for the second empty chunk;

placing a second address of the second empty chunk in the mini-chunk pool;

writing a second portion of the MAC frame into the second empty chunk; and linking the first and second chunks carrying the MAC frame.

12. The system of claim 11, wherein the several chunks are noncontiguous.

13. The system of claim 11, wherein the several chunks are contiguous.

14. The system of claim 11, further comprising a memory manager that searches the memory for chunks comprising frames waiting for a task.

15. The system of claim 14, further comprising the memory manager marking the chunks as empty after the task is completed.

16. The system of claim 11, further comprising a logical gate for the memory.

17. The system of claim 16, wherein the logical gate is closed for both transmission and reception data directions.

18. The system of claim 16, wherein the logical gate is closed for either a transmission data direction or a reception data direction.

19. The system of claim 11, wherein the MAC frame comprises a WiFi MAC frame.

20. The system of claim 11, wherein a writing time for writing the first portion into the first empty chunk is no more than a search time for searching the second empty chunk.

* * * * *